United States Patent
Wang et al.

(10) Patent No.: US 9,490,717 B2
(45) Date of Patent: Nov. 8, 2016

(54) SWITCHING POWER SUPPLY CIRCUIT

(71) Applicant: TDK Corporation, Minato-ku, Tokyo (JP)

(72) Inventors: YueQing Wang, Shanghai (CN); Honglei Wang, Shanghai (CN)

(73) Assignee: TDK Corporation (JP)

( * ) Notice: Subject to any disclaimer, the term of this patent is extended or adjusted under 35 U.S.C. 154(b) by 0 days.

(21) Appl. No.: 14/669,581

(22) Filed: Mar. 26, 2015

(65) Prior Publication Data

US 2016/0079871 A1    Mar. 17, 2016

(30) Foreign Application Priority Data

Sep. 15, 2014   (CN) .......................... 2014 1 0468630

(51) Int. Cl.
  *H02M 3/335*    (2006.01)
  *H02M 3/28*    (2006.01)

(52) U.S. Cl.
  CPC ......... *H02M 3/33546* (2013.01); *H02M 3/285* (2013.01); *H02M 3/335* (2013.01); *H02M 3/33592* (2013.01)

(58) Field of Classification Search
  CPC ........... H03M 3/338; H03M 3/33569; H03M 3/335; H03M 3/33592; H03M 3/33507; Y02B 70/126
  USPC ....... 363/18, 20, 21.04, 21.06, 21.12, 21.14, 363/89, 95, 97
  See application file for complete search history.

(56) References Cited

U.S. PATENT DOCUMENTS

| | | | |
|---|---|---|---|
| 7,196,920 B2 * | 3/2007 | Quitayen .......... | H02M 3/33592 363/127 |
| 2005/0047177 A1 * | 3/2005 | Tobita ............... | H02M 3/33592 363/21.06 |

FOREIGN PATENT DOCUMENTS

| | | |
|---|---|---|
| JP | 2002-345239 A | 11/2002 |
| JP | 2003-164146 A | 6/2003 |
| JP | 2003-284336 A | 10/2003 |
| JP | 2006-246625 A | 9/2006 |
| JP | 2007-074812 A | 3/2007 |

* cited by examiner

Primary Examiner — Nguyen Tran
(74) Attorney, Agent, or Firm — Harness, Dickey & Pierce, P.L.C.

(57) ABSTRACT

A switching power supply device includes: a main transformer; a main switch that is connected between a high potential terminal of an input direct current voltage source and a primary-side main winding; a synchronous rectifier circuit includes: a rectifying switch that is connected to a secondary-side main winding in series and that is turned ON in synchronization with a turning ON state of the main switch and a commutation switch that is connected to the rectifying switch series circuit in parallel and that is turned ON in synchronization with a turning OFF state of the main switch; and an auxiliary switch circuit that turns the commutation switch OFF. When the main switch stops a switching operation while a voltage exists at a first output terminal on a high potential side, the auxiliary switch circuit turns the commutation switch OFF to prevent continuation of self-excited oscillation.

2 Claims, 4 Drawing Sheets

SWITCHING POWER SUPPLY CIRCUIT

CROSS-REFERENCE TO RELATED APPLICATION

This application claims priority to Chinese Patent Application No. 201410468630.1 filed Sep. 15, 2014 which is hereby expressly incorporated by reference herein in its entirety.

BACKGROUND

The present invention relates to a switching power supply device that has a DC (direct current)-DC converter having a synchronous rectifier circuit and that can be utilized for various electronic apparatuses. Specifically, the synchronous rectifier circuit has a rectifying switch element and a commutation switch element.

With respect to a switching power supply device in which an output voltage is low and in which a large current flows, a synchronous rectifier circuit can use a MOS-FET as a rectifying device instead of a diode to decrease conduction loss in a rectifier and increase the efficiency of the switching power supply device. Further, because the above configuration has advantages with respect to the heating of components, the above synchronous rectifier circuit is preferred as a circuit system (Japanese Patent Publication Number 2007-74812 described below). As a synchronous rectification operation of the synchronous rectifier circuit that has a rectifying side MOS-FET corresponding to a rectifying switch element and a commutation side MOS-FET corresponding to a commutation switch element, the rectifying side MOS-FET is turned ON in synchronization with an ON driving signal of a main switch at a primary side. On the other hand, the commutation side MOS-FET is turned ON in synchronization with an OFF driving signal of the main switch at the primary side. As a configuration in which a driving signal of a main switch in an insulated converter is transmitted to a secondary side synchronous rectification part, a separately-excited configuration, in which the signal is directly transmitted via an insulation element such as a pulse transformer and a photocoupler, exists. However, because this configuration (the separately-excited configuration) requires a large number of parts, the circuit is complicated. Further, it is also disadvantageous with respect to a mounting space for components. In contrast, a self-excited configuration, in which the signal is transmitted by using a main winding at a secondary side of a main transformer or a driving winding that is independently provided, exists. Because this configuration (the self-excited configuration) requires a small number of parts, the circuit is relatively simple. Therefore, it is also advantageous with respect to the mounting space used.

To satisfy the demand for a low voltage and a large current at a load side in a switching power supply device in recent years, in a case in which there is an insufficient output rated current in a single switching power supply device, a plurality of switching power supply devices have been used in parallel.

The present invention is directed to a case in which a plurality of switching power supply devices operate in parallel. The switching power supply device includes a synchronous rectifier circuit in which a rectifier at a secondary side is self-excitedly driven.

FIG. 1 shows a circuit diagram of a conventional switching power supply device that corresponds to a synchronous rectifier circuit in which a DC-DC converter unit is a cascaded forward converter unit and in which a rectifier at a secondary side is self-excitedly driven. An operation according to the conventional switching power supply device is explained below with reference to the circuit diagram of FIG. 1.

In FIG. 1, only the DC-DC converter unit is shown by omitting components of a general switching power supply device in which an input AC (alternating current) voltage is filtered/rectified/smoothed.

In FIG. 1, a main transformer isolates a primary side of the unit from a secondary side of the unit. Further, the main transformer T1 is configured with a primary-side main winding Np, a secondary-side main winding Ns1 and an auxiliary winding Ns2, which drives a commutation side MOS-FET Q4.

The polarities of the primary-side main winding Np, the secondary-side main winding Ns1 and the auxiliary winding Ns2 (in a secondary side) of the main transformer T1 are shown by dots in FIG. 1. Further, phase relations of voltages that are induced at each winding are indicated by arrows in FIG. 1. A main switch Q1 corresponds to a switching element such as a MOS-FET. The DC-DC converter unit adopts a cascade forward configuration. Therefore, a connection configuration between input DC voltage terminals +Vin and −Vin of an input DC voltage Vin is in the following order: the input DC voltage terminal+Vin on a high potential side, a dot mark side of the primary-side main winding Np of the main transformer T1, a non-dot mark side of the primary-side main winding Np, a drain terminal of the main switch Q1, a source terminal of the main switch Q1 and the input DC voltage terminal −Vin on a low potential side. Further, an input capacitor C1 is connected between the input DC voltage terminals +Vin and −Vin.

Though descriptions of a detection circuit of an output voltage Vout are omitted in FIG. 1, the detection circuit of the output voltage Vout detects a fluctuation error between a setting voltage and the output voltage Vout and feedbacks the fluctuation error to a control circuit. Further, the control circuit outputs a driving pulse signal that variably controls a time ratio of ON and OFF operations of the main switch Q1 so as to correct the fluctuation error. That is, so-called PWM control is performed.

The main switch Q1 performs a switching operation (ON/OFF operations) by inputting the driving pulse signals from the control circuit to the control terminal of the main switch Q1.

Because the main switch Q1 performs the switching operation, the input DC voltage Vin is intermittently applied to the primary-side main winding Np of the main transformer T1. On the other hand, in the secondary side of the main transformer T1, a rectification smoothing circuit, which is configured with a rectifying side MOS-FET Q3, the commutation side MOS-FET Q4, a choke coil L1 and a capacitor C3, is connected to the secondary-side main winding Ns1.

A drain terminal of the commutation side MOS-FET Q4 and one end of the choke coil L1 are connected to a terminal on the dot mark side of the secondary-side main winding Ns1. Further, the other end of the choke coil L1 is connected to an output terminal +Vout. On the other hand, a drain terminal of the rectifying side MOS-FET Q3 is connected to a terminal on the non-dot mark side of the secondary-side main winding Ns1. Further, a source terminal of the rectifying side MOS-FET Q3, a source terminal of the commutation side MOS-FET Q4 and an output terminal −Vout are connected to each other. In addition, a capacitor C3 is connected between the output terminals +Vout and −Vout.

When the main switch Q1 is turned ON, the input DC voltage Vin is applied to the primary-side main winding Np of the main transformer T1 in the direction of the arrow (the dot side indicates the high potential) shown in FIG. 1. In this case, voltages are respectively generated at the secondary-side main winding Ns1 and the auxiliary winding Ns2 in the direction of the arrow (the dot side indicates the high potential) in the same manner as the above. Specifically, the voltages are in proportion to each turn ratio of a set of the primary-side main winding Np and the secondary-side main winding Ns1 and a set of the primary-side main winding Np and the auxiliary winding Ns2 of the main transformer T1. At the same time, because the voltage that is generated at the secondary-side main winding Ns1 is applied to the gate terminal of the rectifying side MOS-FET Q3 as a positive bias voltage via a capacitor C2 and a resistor R1, the rectifying side MOS-FET Q3 is turned ON. On the other hand, the voltage that is generated at the auxiliary winding Ns2 is a reverse bias voltage for the gate terminal of the commutation side MOS-FET Q4. Therefore, because a gate stored charge of the commutation side MOS-FET Q4 is discharged, the commutation side MOS-FET Q4 is immediately turned OFF.

On the other hand, when the main switch Q1 is turned OFF, the input DC voltage Vin that is applied to the primary-side main winding Np of the main transformer T1 is released so that a flowing current Ip is immediately interrupted. Thereafter, in the main transformer T1, exciting energy, which is accumulated into an inductance of the main transformer T1 by an excitation current that is obtained by eliminating a transmission electric current to the secondary side from the flowing current of the main transformer T1, is generated at the primary-side main winding Np of the main transformer T1 as a flyback voltage that has an inverted polarity with respect to the polarity of the voltage that is applied when the main switches Q1 and Q2 are turned ON.

In this case, in the same way as the primary-side main winding Np, flyback voltages are respectively generated also at the secondary-side main winding Ns1 and the auxiliary winding Ns2 in a direction (the non-dot side indicates the high potential) opposite to the arrow shown in FIG. 1. A peak value of the flyback voltages are in proportion to the turn ratio of each winding. Because the voltages respectively generated at the secondary-side windings are reversed compared with a case in which the main switches Q1 and Q2 are turned ON, the gate terminal of the rectifying side MOS-FET Q3 becomes in a reverse bias state so that a gate stored charge of the commutation side MOS-FET Q3 is discharged. As a result, the commutation side MOS-FET Q3 is immediately turned OFF. Because the flyback voltage that is generated at the auxiliary winding Ns2 is applied to the gate terminal of the commutation side MOS-FET Q4 as a positive bias voltage via a resistor R2, the commutation side MOS-FET Q4 is turned ON.

As explained above, the rectifying side MOS-FET Q3 and the main switch Q1 are turned ON in synchronization with each other. On the other hand, the commutation side MOS-FET Q4 is turned ON in synchronization with the turning OFF state of the main switch Q1.

At the primary side, a DC voltage is converted into an AC voltage by chopping the input DC voltage Vin by the main switch Q1. Then, the AC voltage is transmitted from the primary-side main winding Np to the secondary-side main winding Ns1 via the main transformer T1. Further, the transmitted AC voltage is rectified by synchronous rectifying MOS-FETs Q3, Q4. Further, the transmitted AC voltage is smoothed by the smoothing circuit that is configured with the choke coil L1 and the capacitor C3. At the time, an ON and OFF time ratio (a pulse width) of the main switch Q1 is variably controlled so as to obtain a desired DC voltage.

An operation of the smoothing circuit is explained below. The energy transmission via the secondary-side main winding Ns1 is cut off when the main switch Q1 and the rectifying side MOS-FET Q3 are synchronously turned OFF. However, energy, which is accumulated into the choke coil L1 (an inductor) during an ON period of the main switch Q1 immediately before the cut-off, is continuously supplied to the capacitor C3 and a load via the commutation side MOS-FET Q4 that is shifted to be in an ON state. As a result, the smoothing can be achieved.

The operation of the conventional switching power supply device, in which the DC-DC converter unit adopts the cascade forward configuration and the rectifier at the secondary side corresponds to the synchronous rectifier circuit that is driven by the self-excited configuration, is explained above.

As operating states of the switching power supply device explained above, the following states are typically known: a plurality of switching power supply devices connected in parallel are operated so as to correspond to high power demand; the switching power supply device is operated by connecting a battery as a load; and the switching power supply device is operated in a light-load state including a non-load state by connecting a large capacity capacitor at the load side.

When the switching power supply device, in which the synchronous rectifier circuit that is driven by the self-excited configuration and that is adopted as the rectifier at the secondary side as described in the above background, is under operation in the states explained above and when the main switches stop the switching operations for some reason, the rectifying side MOS-FET and the commutation side MOS-FET alternatively repeat the ON and OFF operations even though the main switches stop. As a result, a self-excited oscillation state can be generated. Specifically, in the self-excited oscillation state, energy is regenerated for an input side of the stopped switching power supply device by the output of the other parallel connected switching power supply devices that are normally operated, by the battery of the load or by the large capacity capacitor at the load side.

As a cause of the stop of the main switches, the following cases are considered: operations of various protection functions such as an overvoltage protection and an heating protection; variation/unevenness of potential differences among the output voltages Vout of the parallel connected power supply devices; a general breakdown; and a stopping operation as a remote control function of the power supply device.

The self-excited oscillation can be generated by a mechanism explained below. There are two modes for the self-excited oscillation. Specifically, a mode 1 is explained with reference to FIG. 2 and a mode 2 is explained with reference to FIG. 3 below.

First of all, the main switch Q1 is suddenly turned OFF. As a result, flyback voltages are generated at each winding of the main transformer T1 in the direction of the arrows (the non-dot sides indicate the high potentials) shown in FIG. 2. Because the gate terminal of the commutation side MOS-FET Q4 becomes in a positive bias state according to the flyback voltage explained above, the commutation side MOS-FET Q4 is turned ON. In this state, when the voltage (an energy source) exists at the output terminal +Vout, an inductor current IL that flows in the choke coil L1 (the inductor) in a direction opposite to the normal operation, i.e., from the side of the current output as shown in FIG. 2. Further, a current Iq4 flows in the commutation side MOS-FET Q4. While a part of the inductor current IL stores energy in the choke coil L1 (the inductor), the inductor current IL increases as time elapses. When the main switch Q1 is turned ON, the current flows in the main transformer T1. The flyback voltage is generated by exciting energy that is accumulated into the inductor (the choke coil L1) by an excitation current component. Specifically, the excitation current component is obtained by eliminating the transmission electric current from the current flowing in the main transformer T1. When the exciting energy is consumed and exhausted, the flyback voltage decreases. As a result, the commutation side MOS-FET Q4 is eventually turned OFF (the above explanation is defined as the mode 1).

When the commutation side MOS-FET Q4 is turned OFF, a voltage at a node connected between the drain terminal of the commutation side MOS-FET Q4 and the choke coil L1 (the inductor) increases up to an electrical potential. Specifically, this electrical potential of the increased voltage is obtained by adding the voltage at the output terminal +Vout on a high potential side and an electromotive voltage which is generated by the energy being accumulated into the choke coil L1 (the inductor) during the ON period of the commutation side MOS-FET Q4. Because the increased voltage is the positive bias voltage for the gate terminal of the rectifying side MOS-FET Q3 via a series circuit of the resistor R1 and the capacitor C2, the rectifying side MOS-FET Q3 is turned ON. At the same time, the increased voltage is applied to the secondary-side main winding Ns1 of the main transformer T1 in the direction of the arrow (the dot side indicates the high potential) shown in FIG. 3. Even at this time, the inductor current IL that flows in the choke coil L1 (the inductor) in the direction opposite to the normal operation, i.e., from the side of the current output as shown in FIG. 3. However, because the energy is discharged from the choke coil L1 (the inductor), the inductor current IL decreases as time elapses. Further, a current Iq3 flows in the rectifying side MOS-FET Q3. At this time, a voltage in which a peak value is proportional to the turn ratio between the primary-side main winding Np and the secondary-side main winding Ns1 is generated at the primary-side main winding Np of the main transformer T1 in the direction of the arrow (the dot side indicates the high potential) shown in FIG. 3. Though the main switch Q1 is turned OFF, energy regeneration from the secondary-side output to the primary-side input occurs because a body diode inside the main switch Q1 is provided in a forward direction with respect to the input DC voltage source. Even at this time, the exciting energy is accumulated into the choke coil L1 (the inductor) by an excitation current Ip in the main transformer T1. When the inductor current IL of the choke coil L1 (the inductor) is equal to an excitation current of the secondary-side main winding Ns1 by discharging the energy that is accumulated into the choke coil L1 (the inductor), the electromotive voltage of the choke coil L1 (the inductor) decreases. As a result, the rectifying side MOS-FET Q3 is eventually turned OFF (the above explanation is defined as the mode 2).

Thereafter, the flyback voltage is generated in the main transformer T1 again by the exciting energy that is accumulated so far in a direction (the non-dot side indicates the high potential) opposite to the arrow shown in FIG. 1 so that the mode 1 starts. Thereafter, the switching power supply device becomes in the self-excited oscillation state in which the mode 1 and the mode 2 are alternatively repeated.

Because the self-excited oscillation state is an uncontrolled state, there is a possibility that the voltage unexpectedly increases depending on the impedance between input DC voltage terminals (+Vin and −Vin). In this case, there is a possibility that the main switch Q1 is broken because an unexpectedly increased voltage exceeds withstand voltages of drain-source voltages Vds between the drain and source of the main switch Q1. Further, the voltage that is obtained by adding the electromotive voltage of the choke coil L1 (the inductor) and the output voltage is applied between the drain and the source (Vds) of the commutation side MOS-FET Q4 when the commutation side MOS-FET Q4 is turned OFF. Similarly, the above added voltage is also applied between the gate and the source (Vgs) of the rectifying side MOS-FET Q3. Therefore, there is a possibility that the rectifying side MOS-FET Q3 and the commutation side MOS-FET Q4 are broken because the added voltage exceeds respective withstand voltages thereof.

Further, there are the following other possible problems: generation of an abnormal loss by flowing an unexpected current; abnormal heat due to the abnormal loss; influence to other power sources as energy sources connected in parallel; and influence to a battery.

SUMMARY

The present invention seeks to solve the problems explained above. An object of the present invention is to provide a switching power supply device that can prevent continuation of self-excited oscillation that is generated when a main switching element is turned OFF while a voltage (an energy source) exists at an output terminal +Vout on a high potential side. Specifically, the switching power supply device has a DC-DC converter unit that adopts a cascade forward configuration and a rectifier circuit corresponding to a synchronous rectifier circuit that is self-excitedly driven.

In order to achieve the above object, the present invention attempts to solve the above problems by using a configuration described below.

A switching power supply device according to one aspect of the present invention includes: a main transformer that has a primary-side main winding and a secondary-side main winding; a main switch that is connected between a high potential terminal of an input direct current voltage source and the primary-side main winding; a synchronous rectifier circuit including: a rectifying switch that is connected to the secondary-side main winding in series to form a rectifying switch series circuit and that is turned ON in synchronization with a turning ON state of the main switch; and a commutation switch that is connected to the rectifying switch series circuit in parallel and that is turned ON in synchronization with a turning OFF state of the main switch; and an auxiliary switch circuit that turns the commutation switch OFF. When the main switch stops a switching operation while a voltage exists at a first output terminal on a high potential side, the auxiliary switch circuit is configured to turn the commutation switch OFF to prevent continuation of self-excited oscillation.

The switching power supply device according to the aspect of the present invention can prevent continuation of self-excited oscillation that is generated when a main switching element is turned OFF with no effect on the normal operation of the switching power supply device.

Further, in the power supply device according to the above aspect of the present invention, the auxiliary switch circuit detects a drain voltage of the commutation switch when the commutation switch is in a conduction state. When the auxiliary switch circuit detects a negative voltage as the drain voltage, the auxiliary switch circuit causes the commutation switch to be in the conduction state. When the auxiliary switch circuit detects no negative voltage as the drain voltage, the auxiliary switch circuit causes the commutation switch to be in an OFF state. The switching power supply device according to the aspect of the present invention can prevent continuation of self-excited oscillation by effectively detecting whether the switching power supply device generates the self-excited oscillation.

Further, in the power supply device according to the above aspect of the present invention, the auxiliary switch circuit includes: a first rectifying device having a first cathode and a first anode, the first cathode being connected to a drain of the commutation switch, the first anode being connected to a second output terminal on a low potential side via a capacitor; a second rectifying device having a second cathode and a second anode, the second anode being connected to a control terminal of the commutation switch; a PNP bipolar transistor; and an NPN bipolar transistor. The PNP bipolar transistor having: a base connected to a node connected between the first rectifying device and the capacitor via a first resistor; a collector connected to a source of the commutation switch; and an emitter connected to the first output terminal on the high potential side via a second resistor. The NPN bipolar transistor having: a base connected to the emitter of the PNP bipolar transistor; a collector connected to the second cathode of the second rectifying device; and an emitter connected to the second output terminal on the low potential side, wherein the capacitor is connected between the base and the emitter. The switching power supply device according to the aspect of the present invention can prevent continuation of self-excited oscillation that is generated when a main switching element is turned OFF by adding a small number of circuit elements.

According to the present invention, there are the following effects. In the switching power supply device in which the DC-DC converter unit adopts the cascade forward configuration and the rectifier circuit corresponding to the synchronous rectifier circuit (the DC-DC converter) that is driven by the self-excited configuration explained above, when the switching operation of the main switching element is stopped for some reason while the voltage (the energy source) exists at the output terminal +Vout on the high potential side, there is a possibility in which a self-excited oscillation is continued. Specifically, because a flyback voltage that is generated at the primary-side main winding Np of the main transformer T1 induces a positive bias voltage at the auxiliary winding Ns2 for driving the commutation switch Q4 a MOS-FET) that is provided in the main transformer T1, the commutation switch Q4 (a MOS-FET) is turned ON. As a result, a draw of an electric current (energy) from the output terminal +Vout on the high potential side triggers to get in a mode in which the self-excited oscillation is continued. In this case, according to the present invention, the self-excited oscillation is detected by an auxiliary switch circuit that also turn the commutation switch Q4 (a MOS-FET) OFF. Thus, when the auxiliary switch circuit operates, the commutation switch Q4 (a MOS-FET) is turned OFF by detecting the self-excited oscillation. Thus, because the commutation switch Q4 (a MOS-FET) cannot be turned ON, the electric current cannot be drawn. As a result, the self-excited oscillation cannot be continued so that the above problems are solved.

DESCRIPTION OF EXEMPLARY EMBODIMENTS

A switching power supply device according to an embodiment of the present invention will be explained below with reference to the drawings.

FIGS. 4-8 are circuit diagrams that show a switching power supply device according to the embodiment of the present invention.

Figure 1:
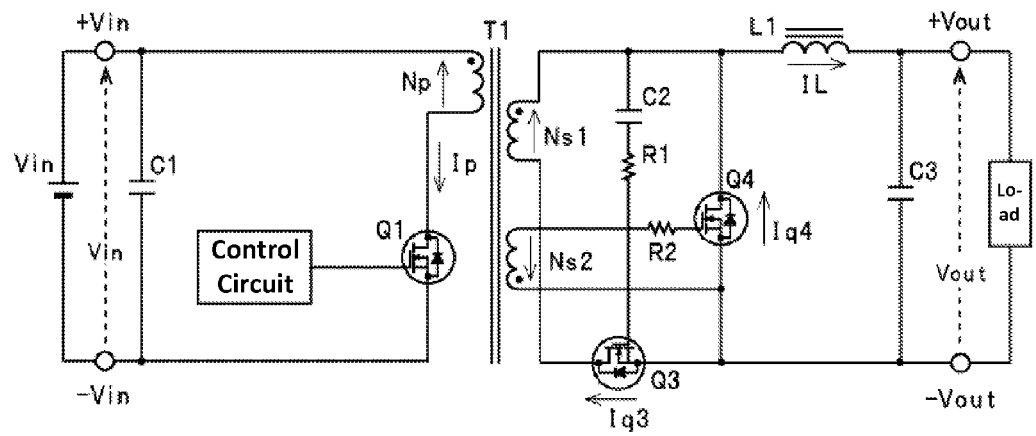
FIG. 1 is a circuit diagram that shows a conventional switching power supply device.
Figure 2:
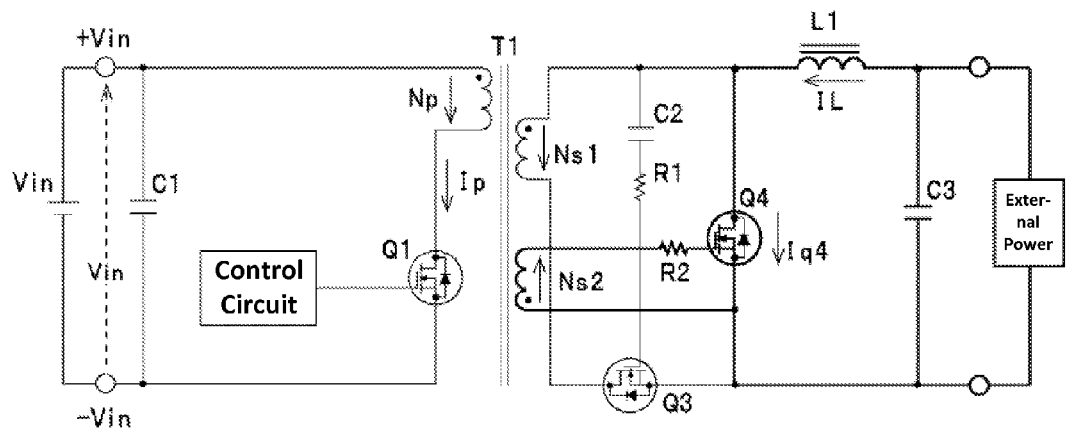
FIG. 2 is a circuit diagram that shows a mode 1 operation of a self-excited oscillation in a conventional switching power supply device.
Figure 3:
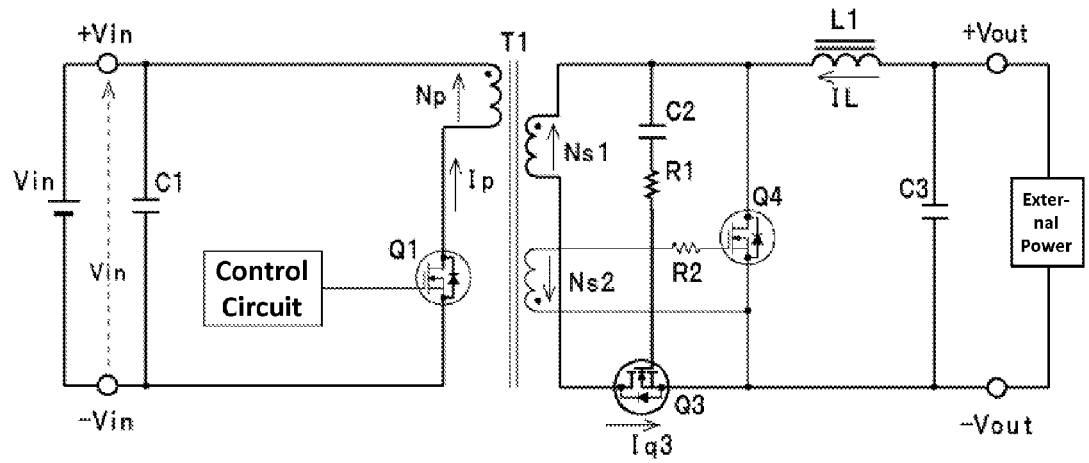
FIG. 3 is a circuit diagram that shows a mode 2 operation of a self-excited oscillation in a conventional switching power supply device.
Figure 4:
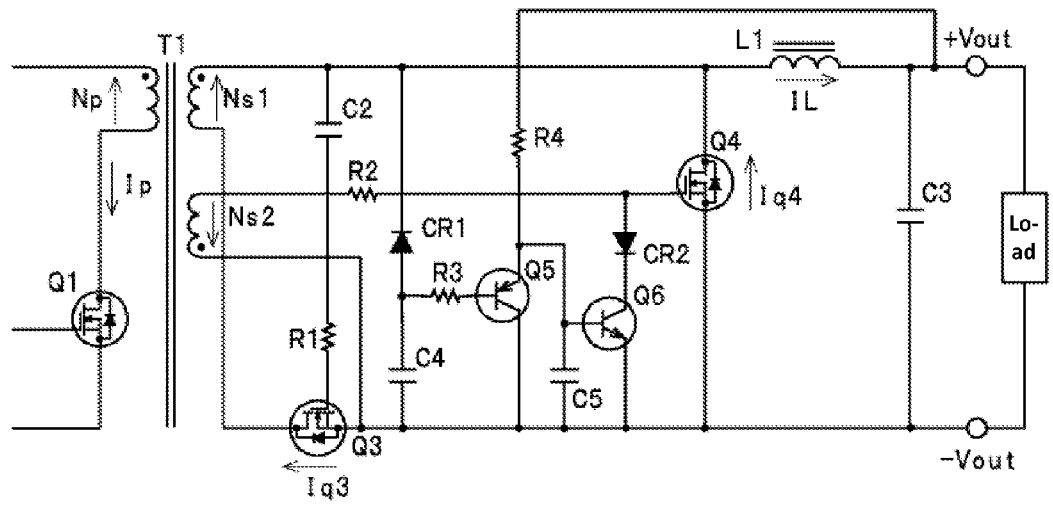
FIG. 4 is a circuit diagram that shows a switching power supply device according to an embodiment of the present invention.

First of all, a circuit configuration of the switching power supply device according to the embodiment of the present invention is explained below with reference to FIG. 4. The switching power supply device shown in FIG. 4 is configured with a main transformer T1, a main switch Q1, a control circuit, a synchronous rectifier circuit that is driven by a self-excited configuration and a smoothing circuit. Specifically, the main transformer T1 isolates a primary side and a secondary side. Further, the main transformer T1 has a primary-side main winding Np, a secondary-side main winding Ns1 and an auxiliary winding Ns2 that is independently provided. The main switch Q1 is connected in series with the primary-side main winding Np between input DC voltage terminals +Vin and −Vin. The control circuit generates and outputs driving pulse signals that drive the main switch Q1 ON and OFF. The synchronous rectifier circuit has a rectifying switch Q3 and a commutation switch Q4. Specifically, the rectifying switch Q3 is connected in series with the secondary-side main winding Ns1 and is driven so as to be turned ON in synchronization with turning ON of the main switch Q1 by a forward voltage that is obtained by the secondary-side main winding Ns1 itself in the main transformer T1. The commutation switch Q4 is connected in parallel with the secondary-side main winding Ns1 and is driven so as to be turned ON in synchronization with turning OFF of the main switch Q1 by a flyback voltage that is obtained via the auxiliary winding Ns2 provided in the main transformer T1 independently. The smoothing circuit is configured with an inductor and a capacitor.

In the switching power supply device explained above, the input DC voltage is converted into an alternating current (AC) voltage by a chopping by turning the main switch Q1 ON and OFF. The AC voltage is transmitted to the secondary side according to a turn ratio of the primary-side main winding Np and the secondary-side main winding Ns1 via the main transformer T1. Further, the AC voltage is rectified and smoothed by the synchronous rectifier circuit and the smoothing circuit so as to be converted to a DC voltage at the both ends of the capacitor of the smoothing circuit. Thereafter, the DC voltage is supplied to a load. This is a forward converter configuration in the switching power supply device.

In addition to the above switching power supply device, the switching power supply devices shown in FIG. 4 has an auxiliary switch circuit. The auxiliary switch circuit is configured with a first rectifying device CR1, a PNP bipolar transistor Q5, a NPN bipolar transistor Q6, and a second rectifying device CR2. Specifically, a cathode of the first rectifying device CR1 is connected to a drain of the commutation switch Q4. An anode of the first rectifying device CR1 is connected to an output terminal −Vout on a low potential side via a first capacitor C4. A base of the PNP bipolar transistor Q5 is connected to a node connected between the first rectifying device CR1 and the first capacitor C4 via a first resistor R3. A collector of the PNP bipolar transistor Q5 is connected to a source of the commutation switch Q4. An emitter of the PNP bipolar transistor Q5 is connected to an output terminal +Vout on a high potential side via a second resistor R4. Further, a base of the NPN bipolar transistor Q6 is connected to the emitter of the PNP bipolar transistor Q5. An emitter of the NPN bipolar transistor Q6 is connected to the output terminal −Vout on the low potential side. A collector of the NPN bipolar transistor Q6 is connected to a cathode of the second rectifying device CR2. In addition, a second capacitor C5 is provided between the base and emitter of the NPN bipolar transistor Q6. Further, an anode of the second rectifying device CR2 is connected to a control terminal of the commutation switch Q4.

Here, it is explained how the auxiliary switch circuit prevents the problem in which the self-excited oscillation is generated with no effect on a normal operation.

Figure 5:
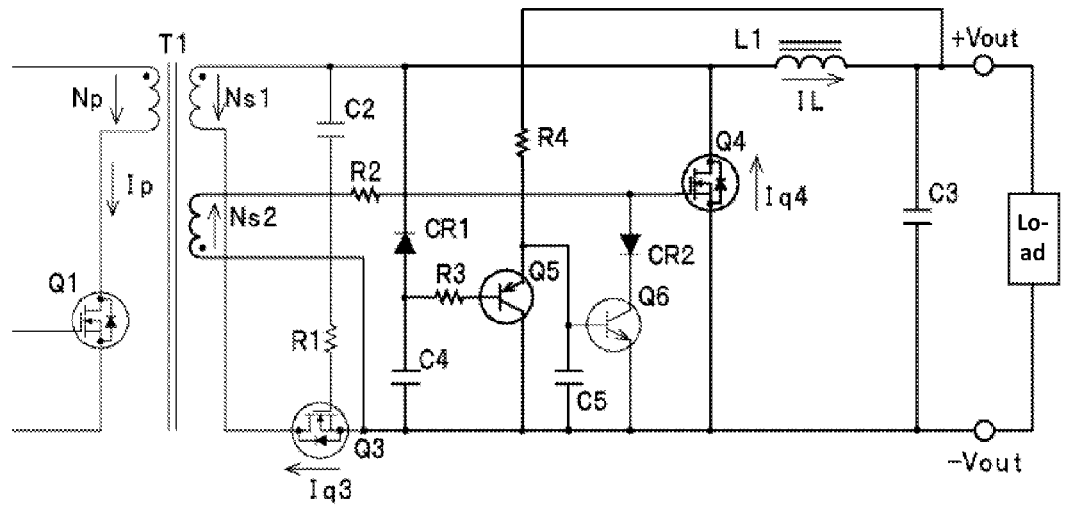
FIG. 5 is a circuit diagram that shows a normal operation of a switching power supply device according to an embodiment of the present invention.

A normal operation of the DC-DC converter unit of the switching power supply device according to the embodiment of the present invention is explained below with reference to FIGS. 5 and 6.

When the main switch Q1 is turned OFF, the flyback voltage is generated at the main transformer T1. FIG. 5 shows an operating state of the switching power supply device when the main switch Q1 is turned OFF. At this time, because a gate terminal of the rectifying side MOS-FET (a switch) Q3 is in a reverse bias state by the flyback voltage, the rectifying side MOS-FET Q3 is turned OFF. On the other hand, because a gate terminal of the commutation side MOS-FET (a switch) Q4 is in a positive bias state by the flyback voltage, the commutation side MOS-FET Q4 is turned ON. When the commutation side MOS-FET Q4 is turned ON, energy, which is accumulated into an inductor L1 during an ON period of the main switch Q1, is discharged to the load as a reflux current via the commutation side MOS-FET Q4 that is in an ON state. An electric current flows in the commutation side MOS-FET Q4 in a direction from the source to the drain. The commutation side MOS-FET Q4 becomes a state in which an FET channel cannot be turned ON because of two delay elements. One delay element is a rise delay of the flyback voltage. The other delay element is a necessary time for charging until a gate threshold voltage while charging a capacity component that the MOSFET has between the gate and the source. During such a period, the electric current flows by conduction of a body diode inside the MOSFET. During a conduction period of the body diode, an electrical potential of the drain terminal of the commutation side MOS-FET Q4 is decreased by a forward direction voltage drop Vf of the body diode with reference to an electrical potential of the output terminal −Vout on the low potential side. The first capacitor C4 is connected to the drain terminal of the commutation side MOS-FET Q4 via the first rectifying device CR1. Therefore, during the conduction period of the body diode, an electrical potential of the first capacitor C4 located at the anode side of the first rectifying device CR1 becomes the same as the electrical potential of the output terminal −Vout on the low potential side. The reason is because a forward direction voltage drop Vf of the first rectifying device CR1 and a forward direction voltage drop Vf of the body diode are canceled out. An electrical charge of the first capacitor C4 is immediately discharged as a part of the reflux current of the inductor L1 during the conduction period of the body diode. The base of the PNP bipolar transistor Q5 is connected to the node connected between the first capacitor C4 and the anode of the first rectifying device (a diode) CR1 via the first resistor R3. Further, the base of the NPN bipolar transistor Q6 is connected to the emitter of the PNP bipolar transistor Q5. When an electrical potential of the node connected between the first capacitor C4 and the anode of the rectifying device (a diode) CR1 becomes the same electrical potential of the output terminal −Vout on the low potential side, a base potential of the NPN bipolar transistor Q6 is clamped by a voltage between the base and the emitter (a base-emitter voltage) of the PNP bipolar transistor Q5. As a result, because the NPN bipolar transistor Q6 cannot be turned ON, the operation of the commutation side MOS-FET Q4 is not affected.

Figure 6:
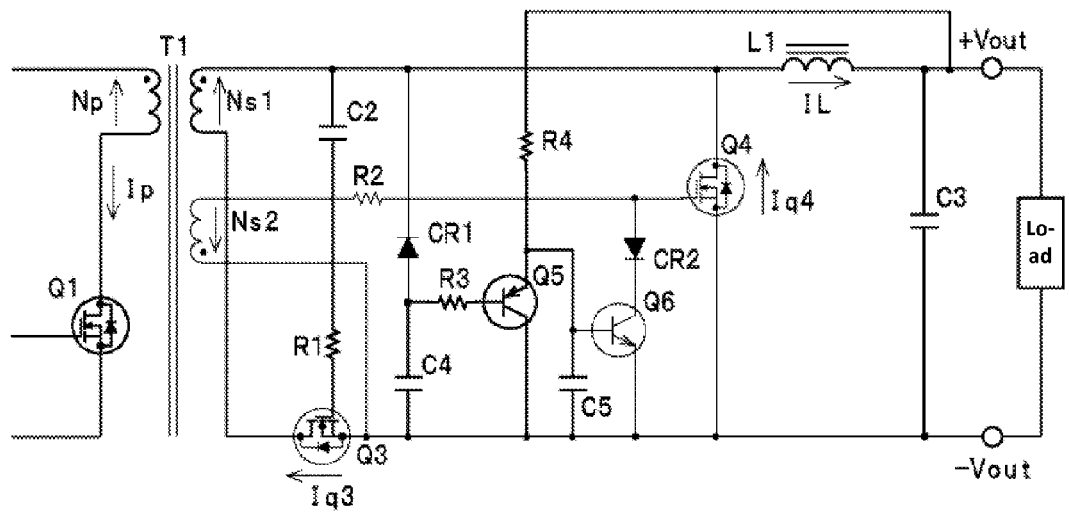
FIG. 6 is a circuit diagram that shows a normal operation of a switching power supply device according to an embodiment of the present invention.

FIG. 6 shows an operating state of the switching power supply device when the main switch Q1 is turned ON. When the main switch Q1 is turned ON so that the rectifying side MOS-FET Q3 is in a conduction state, the PNP bipolar transistor Q5 stays in an ON state during a period of time (for instance, a time that is more than ten times as long as an oscillation period of the switching power supply device) that is limited by an electric charge time constant of the first resistor R3 and the first capacitor C4. On the other hand, the NPN bipolar transistor Q6 stays in an OFF state. Therefore, the auxiliary switch circuit according to the embodiment of the present invention does not affect the normal operation of the switching power supply device at all.

Figure 7:
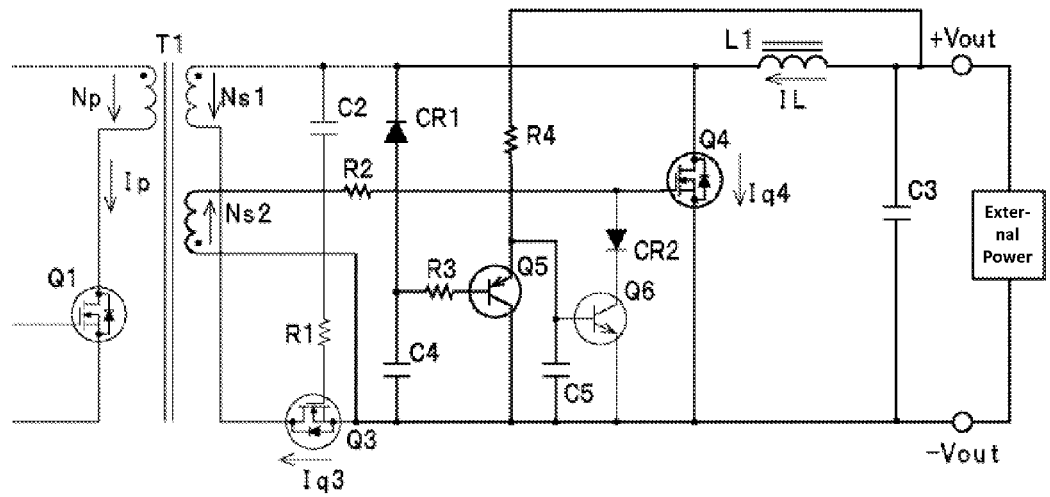
FIG. 7 is a circuit diagram that shows an operation of an auxiliary switch circuit of a switching power supply device according to an embodiment of the present invention.
Figure 8:
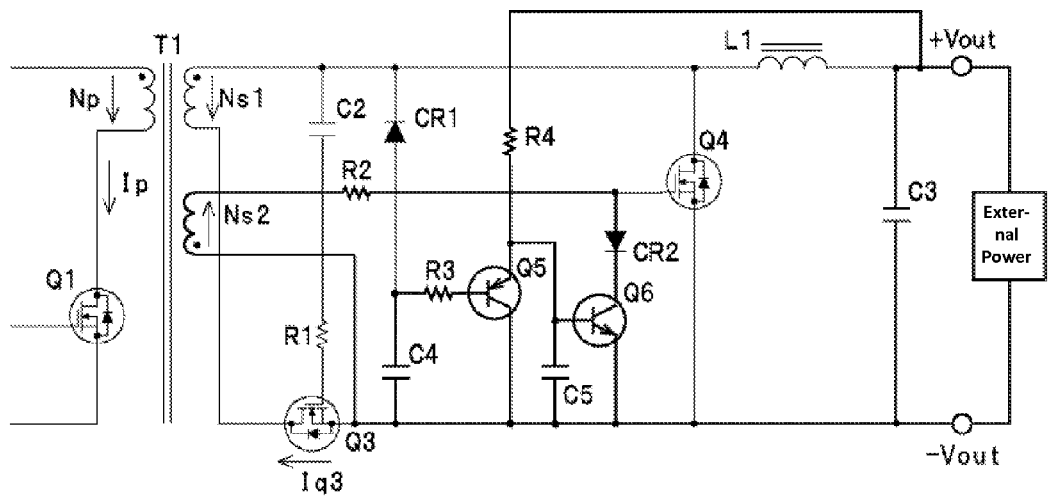
FIG. 8 is a circuit diagram that shows an operation of an auxiliary switch circuit of a switching power supply device according to an embodiment of the present invention.

Next, a self-excited oscillation control (prevention) operation according to the embodiment of the present invention is explained below with reference to FIGS. 7 and 8. When a driving signal to the main switch Q1 from the control circuit is stopped and the switching operation of the main switch Q1 is turned OFF (stopped) while a voltage (an energy source) exists at the output terminal +Vout on the high potential side, the flyback voltage is generated at the primary-side main winding Np of the main transformer T1.

Specifically, a non-dot mark side of the primary-side main winding Np has a high potential in this generated flyback voltage. Thus, a flyback voltage that is in proportion to a turn ratio of the primary-side main winding Np and the auxiliary winding Ns2 is generated at the auxiliary winding Ns2 at a secondary side in a direction in which the control terminal of the commutation side MOS-FET Q4 is in a positive bias state. At this time, because the commutation side MOS-FET Q4 is turned ON, an electric current (energy) is drawn from the voltage (the energy source) that exists at the output terminal +Vout on the high potential side via the inductor L1 in a direction from the drain toward the source. As a result, an electrical potential of the drain terminal of the commutation side MOS-FET Q4 becomes a higher by a saturation voltage Vds-ON (Q4) between the drain and the source with reference to an electrical potential of the output terminal −Vout on the low potential side. Therefore, an electrical potential of the first capacitor C4 corresponds to an electrical potential that is added the forward direction voltage drop Vf of the first rectifying device CR1 to the saturation voltage Vds-ON (Q4) between the drain and the source. Thus, an electrical potential of the emitter of the PNP bipolar transistor Q5 corresponds to an electrical potential that is further added the voltage between the base and the emitter (the base-emitter voltage). Therefore, because the NPN bipolar transistor Q6 is turned ON by this electrical potential, the gate terminal of the commutation side MOS-FET Q4 is short-circuited via the second rectifying device CR2. As a result, the commutation side MOS-FET Q4 is turned OFF (refer to FIG. 7).

Thereafter, even if the gate terminal of the commutation side MOS-FET Q4 is in the positive bias state by the auxiliary winding Ns2, the self-excited oscillation cannot be continued so that the above problems are solved. Specifically, because the electric current is drawn from the voltage (the energy source) that exists at the output terminal +Vout on the high potential side via the second resistor R4, the NPN bipolar transistor Q6 is turned ON when the emitter potential of the PNP bipolar transistor Q5 exceeds an electrical potential between the base and the emitter (a base-emitter potential) of NPN bipolar transistor Q6. As a result, the gate terminal of the commutation side MOS-FET Q4 is short-circuited. Thus, the NPN bipolar transistor Q6, which works as an auxiliary switch, stays in the ON state. As a result, because the commutation side MOS-FET Q4 becomes in the OFF state, the self-excited oscillation cannot be continued (refer to FIG. 8). That is, because the commutation side MOS-FET Q4 cannot be turned ON and the electric current cannot be drawn, the self-excited oscillation cannot be continued so that the above problems are solved.

In the embodiment of the present invention, the normal operation and the self-excited oscillation are determined by detecting a potential difference of the drain of the commutation side MOS-FET Q4. That is, when a negative voltage appears as the drain potential of the commutation side MOS-FET Q4 (when the electric current flows via the body diode inside the commutation side MOS-FET Q4), the conduction of the commutation side switch Q4 is maintained. When the negative voltage does not appear as the drain potential of the commutation side MOS-FET Q4 (when the self-excited oscillation is generated), the commutation side MOS-FET Q4 is turned OFF. As explained above, the generation of the self-excited oscillation of the switching power supply device can effectively be detected.

According to the embodiment of the present invention, the state in which the self-excited oscillation is continuously generated can be prevented with no effect on the normal operation of the switching power supply device. Further, in the embodiment of the present invention, the self-excited oscillation can be suppressed only by adding a small number of circuit elements to the secondary side.

Thus, the present invention has been explained with reference to the drawings and the embodiments above. However, the present invention should not be limited to the embodiments explained above. For instance, though the primary side of the converter is described by one transistor configuration forward converter in the above explanation, the present invention is not limited to the one transistor configuration forward converter. Further, with respect to the driving of the synchronization rectifying device, it is discussed that the rectifying side is driven by the forward voltage from the main winding and the commutation side is driven by the flyback voltage from the auxiliary winding. However, a configuration in which the rectifying side is driven by the forward voltage from the auxiliary winding can be adopted. A configuration in which the commutation side is driven by the flyback voltage from the main winding can also be adopted. Thus, a configuration in which as long as the rectifying side is driven by the forward voltage and the commutation side is driven by the flyback voltage, these voltages can be from the main winding or from the auxiliary winding. Further, another driving method such as a pulse transformer can also be adopted in any elements.

The switching power supply device being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:
1. A switching power supply device, comprising:
   a main transformer that has a primary-side main winding and a secondary-side main winding;
   a main switch that is connected between a high potential terminal of an input direct current voltage source and the primary-side main winding;
   a synchronous rectifier circuit including:
      a rectifying switch that is connected to the secondary-side main winding in series to form a rectifying switch series circuit and that is turned ON in synchronization with a turning ON state of the main switch; and
      a commutation switch that is connected to the rectifying switch series circuit in parallel and that is turned ON in synchronization with a turning OFF state of the main switch; and
   an auxiliary switch circuit that turns the commutation switch OFF, wherein
   when the main switch stops a switching operation while a voltage exists at a first output terminal on a high potential side, the auxiliary switch circuit is configured to turn the commutation switch OFF,
   the auxilary switch circuit includes:
      a first rectifying device having a first cathode and a first anode, the first cathode being connected to a drain of the commutation switch, the first anode being connected to a second output terminal on a low potential side via a capacitor;
      a second rectifying device having a second cathode and a second anode, the second anode being connected to a control terminal of the commutation switch;
      a PNP bipolar transistor having:
         a base connected to a node connected between the first rectifying device and the capacitor via a first resistor;
         a collector connected to a source of the commutation switch; and
         an emitter connected to the first output terminal on the high potential side via a second resistor; and
      an NPN bipolar transistor having:
         a base connected to the emitter of the PNP bipolar transistor;
         a collector connected to the second cathode of the second rectifying device; and
         an emitter connected to the second output terminal on the low potential side, wherein the capacitor is connected between the base and the emitter.

2. The switching power supply device according to claim 1, wherein
the auxiliary switch circuit detects a drain voltage of the commutation switch when the commutation switch is in a conduction state,
when the auxiliary switch circuit detects a negative voltage as the drain voltage, the auxiliary switch circuit causes the commutation switch to be in the conduction state, and
when the auxiliary switch circuit detects no negative voltage as the drain voltage, the auxiliary switch circuit causes the commutation switch to be in an OFF state.

* * * * *